United States Patent
Nagesha Rao

(10) Patent No.: US 11,270,018 B2
(45) Date of Patent: *Mar. 8, 2022

(54) SYSTEM AND METHOD FOR PROVIDING DATA SECURITY IN A HOSTED SERVICE SYSTEM

(71) Applicant: International Business Machines Corporation, Armonk, NY (US)

(72) Inventor: Pallavi T. Nagesha Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,516

(22) Filed: Jul. 9, 2019

(65) Prior Publication Data
US 2019/0332797 A1    Oct. 31, 2019

Related U.S. Application Data

(63) Continuation of application No. 15/206,077, filed on Jul. 8, 2016, now Pat. No. 10,366,248, which is a (Continued)

(51) Int. Cl.
*H04L 9/00* (2006.01)
*G06F 21/62* (2013.01)
(Continued)

(52) U.S. Cl.
CPC ........ *G06F 21/6227* (2013.01); *G06F 21/335* (2013.01); *G06F 21/6209* (2013.01);
(Continued)

(58) Field of Classification Search
CPC ............ H04W 12/04; G06F 2221/2107; G06F 21/6227; G06F 21/60; G06F 21/602;
(Continued)

(56) References Cited

U.S. PATENT DOCUMENTS 7,249,118 B2   7/2007  Sandler et al.
7,461,077 B1   12/2008 Greenwood
(Continued)

FOREIGN PATENT DOCUMENTS

WO    2007044964    4/2007

OTHER PUBLICATIONS

Candan et al, Frontiers in Information and Software as Services, Apr. 2, 2009, IEEE, pp. 1761-1768.*
(Continued)

*Primary Examiner* — Christopher J Brown
*Assistant Examiner* — Jenise E Jackson
(74) *Attorney, Agent, or Firm* — Jamar K. Ray

(57) ABSTRACT

Aspects of the present disclosure are directed to methods and systems for protecting sensitive data in a hosted service system. The system includes a host system having a database management system (DBMS) with a database and a query pre-parser. A processing application is configured to process a request from a tenant system and route the processed request as a query to the query pre-parser. The query pre-parser is configured to decrypt a sensitive data part of the query, generate a modified query including the decrypted sensitive data part, generate a database query using the modified query, and transmit the database query to the database.

16 Claims, 6 Drawing Sheets

Related U.S. Application Data continuation of application No. 12/648,506, filed on Dec. 29, 2009, now Pat. No. 9,401,893.

(51) Int. Cl.
*G06F 21/33* (2013.01)
*H04L 29/06* (2006.01)
*H04L 9/08* (2006.01)

(52) U.S. Cl.
CPC ............ *H04L 9/08* (2013.01); *H04L 63/0281* (2013.01); *H04L 63/0428* (2013.01); *H04L 63/06* (2013.01)

(58) Field of Classification Search
CPC ...... G06F 21/604; G06F 21/606; G06F 21/62; G06F 21/6209; G06F 21/6218; G06F 21/335; G06F 21/6206; H04L 9/08; H04L 63/0281; H04L 63/06; H04L 63/0428; H04L 63/062
USPC ......................................................... 380/277
See application file for complete search history.

(56) References Cited

U.S. PATENT DOCUMENTS

| | | | |
|---|---|---|---|
| 7,769,176 B2 | 8/2010 | Watson et al. | |
| 8,200,705 B2 | 6/2012 | Wang et al. | |
| 8,291,490 B1* | 10/2012 | Ahmed | G06F 21/604 |
| | | | 726/17 |
| 8,463,815 B1* | 6/2013 | Zoellner | G06F 16/285 |
| | | | 707/783 |
| 8,473,518 B1* | 6/2013 | Yancey | G06F 16/21 |
| | | | 707/786 |
| 9,401,893 B2 | 7/2016 | Nagesha Rao | |
| 10,366,248 B2 | 7/2019 | Nagesha Rao | |
| 2002/0011216 A1 | 1/2002 | Nguyen | |
| 2002/0078049 A1* | 6/2002 | Samar | G06F 21/6218 |
| 2002/0112167 A1 | 8/2002 | Boneh et al. | |
| 2003/0217033 A1 | 11/2003 | Sandler et al. | |
| 2004/0059945 A1 | 3/2004 | Henson | |
| 2005/0028134 A1* | 2/2005 | Zane | G06F 16/24524 |
| | | | 717/106 |
| 2005/0240591 A1 | 10/2005 | Marceau et al. | |
| 2005/0278259 A1 | 12/2005 | Gunaseelan et al. | |
| 2006/0047652 A1 | 3/2006 | Pandit et al. | |
| 2007/0103984 A1 | 5/2007 | Kavuri et al. | |
| 2007/0136257 A1 | 6/2007 | Yoshizawa | |
| 2007/0201654 A1 | 8/2007 | Shenfield | |
| 2007/0201700 A1 | 8/2007 | Hacigumus | |
| 2007/0203925 A1 | 8/2007 | Sandler et al. | |
| 2007/0271308 A1 | 11/2007 | Bentley et al. | |
| 2008/0065592 A1 | 3/2008 | Doyle | |
| 2008/0162483 A1* | 7/2008 | Becker | G06F 16/27 |
| 2008/0232598 A1 | 9/2008 | Vennelakanti et al. | |
| 2008/0263058 A1* | 10/2008 | Peden | G06Q 10/10 |
| 2009/0003608 A1 | 1/2009 | Lee et al. | |
| 2009/0043775 A1 | 2/2009 | Cotner et al. | |
| 2009/0154705 A1 | 6/2009 | Price et al. | |
| 2009/0240564 A1 | 9/2009 | Boerries et al. | |
| 2009/0240956 A1 | 9/2009 | Metzger et al. | |
| 2009/0300002 A1* | 12/2009 | Thomas | G06F 16/2457 |
| 2010/0004975 A1 | 1/2010 | White et al. | |
| 2010/0125545 A1 | 5/2010 | Navas | |
| 2010/0250958 A1 | 9/2010 | Browning | |
| 2010/0250969 A1 | 9/2010 | Bellovin et al. | |
| 2011/0022582 A1* | 1/2011 | Unnikrishnan | G06F 16/2272 |
| | | | 707/715 |
| 2012/0124573 A1 | 5/2012 | Mamtani et al. | |
| 2012/0185437 A1 | 7/2012 | Pavlov et al. | |
| 2012/0254136 A1 | 10/2012 | Bosson | |
| 2013/0058468 A1* | 3/2013 | Martino | H04L 69/08 |
| | | | 379/93.01 |
| 2013/0067225 A1 | 3/2013 | Shochet et al. | |
| 2014/0237234 A1 | 8/2014 | O'Connor et al. | |
| 2019/0332796 A1 | 10/2019 | Nagesha Rao | |

OTHER PUBLICATIONS

Damiani et al, Implementation of a Storage Mechanism for Untrusted DBMs, Oct. 31, 2003, IEEE, pp. 1-9.*

Hui et al, Supporting Database Applications as a Service, May 1, 2009, IEEE, pp. 832-843. (Year: 2009).*

Hacigumus et al, Providing Database as a Service, Mar. 1, 2002, IEEE, pp. 1-10. (Year: 2002).*

Zhang et al.; A Secure Cipher Index Over Encrypted Character Data in Database; Proceedings of the Seventh International Conference on Machine Learning and Cybernetics; Jul. 12-15, 2008; IEEE; pp. 1111-1116.

Zhang et al.; A Method of Bucket Index over Encrypted Character Data in Database; Third International Conference on Intelligent Information Hiding and Multimedia Signal Processing (vol. 1); Nov. 26-28, 2007; IEEE; pp. 1-4.

Ohtaki; Partial Disclosure of Searchable Encrypted Data with Support for Boolean Queries; The Third International Conference on Availability, Reliability and Security; 2008; IEEE; pp. 1083-1090.

Schrefl et al.; SemCrypt—Ensuring Privacy of Electronic Documents Through Semantic-Based Encrypted Query Processing; Proceedings of the 21st International Conference on Data Engineering (ICDE '05); 2005; IEEE; pp. 1-10.

Host-Proof Hosting; Internet Blog; Available at http://passpack.wordpress.com/2008/03/10/host-proof-hosting/; Mar. 10, 2008.

Jammalamadaka et al.; Querying Encrypted XML Documents; 10th International Database Engineering and Applications Symposium (IDEAS'06); Dec. 14, 2006; pp. 1-8.

Chung et al.; Anti-Tamper Databases: Processing Aggregate Queries over Encrypted Databases; Proceedings of the 22nd International Conference on Data Engineering Workshops (ICDEW'06); Apr. 7, 2006; pp. 1-9.

Wang et al.; Efficient Secure Query Evaluation over Encrypted XML Databases; Proceedings of the 32nd International Conference on Very Large Data Bases (VLDB '06); Sep. 15, 2006; pp. 127-138.

Li et al.; Automaton Segmentation: A New Approach to Preserve Privacy in XML Information Brokering; Proceedings of the 14th ACM Conference on Computer and Communications Security (CCS 2007); Nov. 2, 2007; pp. 508-518.

Chebotko et al.; Scientific Workflow Provenance Querying with Security Views; The Ninth International Conference on Web-Age Information Management; Jul. 2008; pp. 349-356.

Brodsky et al.; Secure Databases: Constraints, Inference Channels, and Monitoring Disclosures; IEEE Transactions on Knowledge and Data Engineering; vol. 12; Issue: 6; Dec. 2000; pp. 900-919.

Le Viet et al., "Design and Implementation of a Relational Database Server in a Heterogeneous Network Environment", IEEE, Feb. 7, 1986, pp. 685-692, (Year: 1986), in NOA for U.S. Appl. No. 16/506,461, dated Oct. 26, 2021.

Zhang et al., "King Base Lite: A Smart Mobile Embedded Database System", IEEE, May 17, 2000, pp. 806-811, (Year: 2000), in the NOA for U.S. Appl. No. 16/506,461, dated Oct. 26, 2021.

Hui et al., "Supporting Database Applications as a Service", May 1, 2009, IEEE, pp. 832-843, (Year: 2009), as cited in NOA for U.S. Appl. No. 16/506,461, dated Oct. 6, 2021.

Yaish et al., "A Multi-tenant Database Architecture Design for Software Applications", 2013 IEEE 16th International Conference on Computational Science and Engineering, Dec. 5, 2013, pp. 933-940.

Hacigumus et al., "Providing Database as a Service", Proceedings of the 18th International Conference on Data Engineering, Mar. 1, 2002, 10 pages.

* cited by examiner

SYSTEM AND METHOD FOR PROVIDING DATA SECURITY IN A HOSTED SERVICE SYSTEM

BACKGROUND

A hosted service system is a client-server architecture where certain tools, services or applications are hosted at the server side, and one or more client systems (also called tenant systems) are coupled to the server, also called a host, over a network. The server could be, for example, a virtual server or a real server. The tenant system or the client system may have multiple clients. The clients may use some or all of the services provided by the host server, on an as-needed basis. One of the advantages of this architecture is that the client(s) do(es) not have to buy and/or maintain the infrastructure to support the tools or applications. The other advantage is that the clients can use only relevant parts/services of the applications on an as need basis.

In hosted service systems, security of the tenant system data continues to be an issue and to some degree, an inhibitor for adoption. The "Software as a Service" (SaaS) model, or Cloud computing model, can be viewed as an example of a hosted system services. Even though there are cost advantages to this model, as the industry enters a new of wave of awareness and adoption, it is typical for the consumers/clients of the hosted applications still to be wary and unsure if their data will be secure with the vendor/host of the service.

Many of the SaaS vendors have managed to mitigate security threats from external sources, and making sure that tenants' have limited access to their own data and that no other tenant system or user can access data they are not supposed to view. However, security issues persist, in that the tenant system data, including possibly sensitive data, is still vulnerable from internal security threats posed by internal systems of the host, for example, administrators of the databases and/or applications at the host.

Typically, the vendor/host assures a client at the tenant system that all the data is stored as encrypted data in the host database. As is well known, various encryption methodologies exist to encrypt the data stored in the host database. The public key infrastructure (PKI) and the Data Encryption Standard (DES) are known examples of encryption methodologies. The vendor/host may also secure the data while the data is sent across on the network. The data is encrypted using transport layer protocols, such as, for example, the Secure Socket Layer (SSL) protocol. Transport Layer Security (TLS) is another cryptographic protocol well studied in the prior art that facilitates providing security and data integrity for communications over TCP/IP networks such as the Internet. TLS and SSL encrypt the segments of network connections at the transport layer end-to-end. Several versions of the protocols are in wide-spread use in applications like web browsing, electronic mail, Internet faxing, instant messaging and Voice-over-IP (VoIP).

However, an issue that continues to remain unsolved is that the application or software that processes tenant system data at the vendor/host system continues to have access to unencrypted sensitive data of the tenant system, leading to security concerns. Existing methodologies, however, appear to only partially resolve the security issue as the encryption logic still resides with the host/vendor.

Some other prior art approaches use symmetric and asymmetric keys for the hosted systems. However, those solutions do not appear to not solve the host security issue.

BRIEF SUMMARY

Aspects of the present disclosure are directed to systems and methods for protecting sensitive data in a hosted service system.

According to a one aspect of the present disclosure, a hosted service system for protecting sensitive data is provided. The system includes a host system having a database management system (DBMS) with a database and a query pre-parser. A processing application is configured to process a request from a tenant system and route the processed request as a query to the query pre-parser. The query pre-parser is configured to decrypt a sensitive data part of the query, generate a modified query including the decrypted sensitive data part, generate a database query using the modified query, and transmit the database query to the database.

A second aspect of the present disclosure involves a hosted service system for protecting sensitive data. The system includes a host system, where the host system is one of a virtual server or a real server. The host system includes a federation server and a database management system (DBMS). The DBMS has a database, a query pre-parser, where the query pre-parser is adapted to receive, via the federation server, communications from a key management system (KMS) and a metadata service system (MSS) associated with a tenant system. The host system is adapted to process at least some of the data of the tenant system. The query pre-parser is adapted to receive a query, receive, from the MSS, a determination if the query received by the query pre-parser has a part of the query associated with the sensitive data. If the part of the query is associated with the sensitive data, receive, from the KMS, at least one encryption key corresponding to the part of the query, decrypt the part of the query using the at least one encryption key corresponding to the part of the query, generate a modified query, where the modified query includes the decrypted part of the query, and generate a database query (DB query) using at least one of the query or the modified query. The DB query is transmitted to the database. The system further includes a results handler, and the query pre-parser and the results handler are both communicatively coupled to the federation server.

A third aspect of the present disclosure involves a hosted service system for protecting sensitive data. The system includes a host system, where the host system is one of a virtual server or a real server, a federation server and a database management system (DBMS). The DBMS has a database, a query pre-parser, where the query pre-parser is adapted to receive, via the federation server, communications from a key management system (KMS) and a metadata service system (MSS) associated with a tenant system where the host system is adapted to process at least some of the data of the tenant system. The query pre-parser is adapted to receive a query, receive, from the MSS, a determination if the query received by the query pre-parser has a part of the query associated with the sensitive data. If the part of the query is associated with the sensitive data, receive, from the KMS, at least one encryption key corresponding to the part of the query, decrypt the part of the query using the at least one encryption key corresponding to the part of the query, generate a modified query, where the modified query includes the decrypted part of the query, generate a database query (DB query) using at least one of the query or the modified query, and transmit the DB query to the database. The system further includes a results handler, where the query pre-parser and the results handler are both communicatively coupled to the federation server.

A fourth aspect of the present disclosure involves a method for protecting sensitive data in a hosted service system, where the hosted service system includes a host system adapted to receive data from a tenant system, the tenant system being communicatively coupled to the host system via a communication network, and where the sensitive data is some of the data of the tenant system. The method includes receiving a client request from a client associated with the tenant system and determining if a part of the client request is associated with the sensitive data, where the determination is performed by a metadata service system (MSS), and where the MSS is adapted to maintain metadata of the sensitive data, where the metadata includes encryption information. If the part of the client request is associated with the sensitive data, receive, from a key management system (KMS), at least one encryption key corresponding to the part of the client request, where the KMS is adapted to function as a repository of encryption keys, the encryption keys being used to encrypt the sensitive data, encrypt the part of the client request using the at least one encryption key corresponding to the part of the client request and generate a modified client request, where the modified client request includes the encrypted part of the client request. The method further includes generating a tenant request by manipulating at least one of the client request or the modified client request, where the manipulation is performed using a data exchange format, transmitting the tenant request, routing the tenant request as a query and receiving the query, where the receiving is performed by a query pre-parser, and where the host system includes the query pre-parser. The method also includes determining if the query received by the query pre-parser has a part of the query associated with the sensitive data, where the determination is performed by the MSS. If the part of the query is associated with the sensitive data, receiving, from the KMS, at least one encryption key corresponding to the part of the query, decrypting the part of the query using the at least one encryption key corresponding to the part of the query and generating a modified query, where the modified query includes the decrypted part of the query. Further, the method includes generating a database query (DB query) using at least one of the query or the modified query and transmitting the DB query to the database.

A fifth aspect of the present disclosure involves a system for protecting data. The system includes a first system, where the first system is one of a virtual server or a real server. The first system includes a key management system (KMS), a metadata service system (MSS), the KMS and the MSS being communicatively coupled to each other and a database management system (DBMS). The DBMS has a database, a query pre-parser and a results handler, where the query pre-parser and the results handler are communicatively coupled to the KMS and the MSS. The first system is adapted to receive, via a network, data from a second system having an associated client, where the first system is adapted to process at least some data of the second system.

BRIEF DESCRIPTION OF THE DRAWINGS

Embodiments of the present disclosure are described in detail below, by way of example only, with reference to the following schematic drawings, where.

DETAILED DESCRIPTION

Aspects of the disclosure describe, in various exemplary embodiments, systems and methods for protecting sensitive data in a hosted service system.

Figure 1:
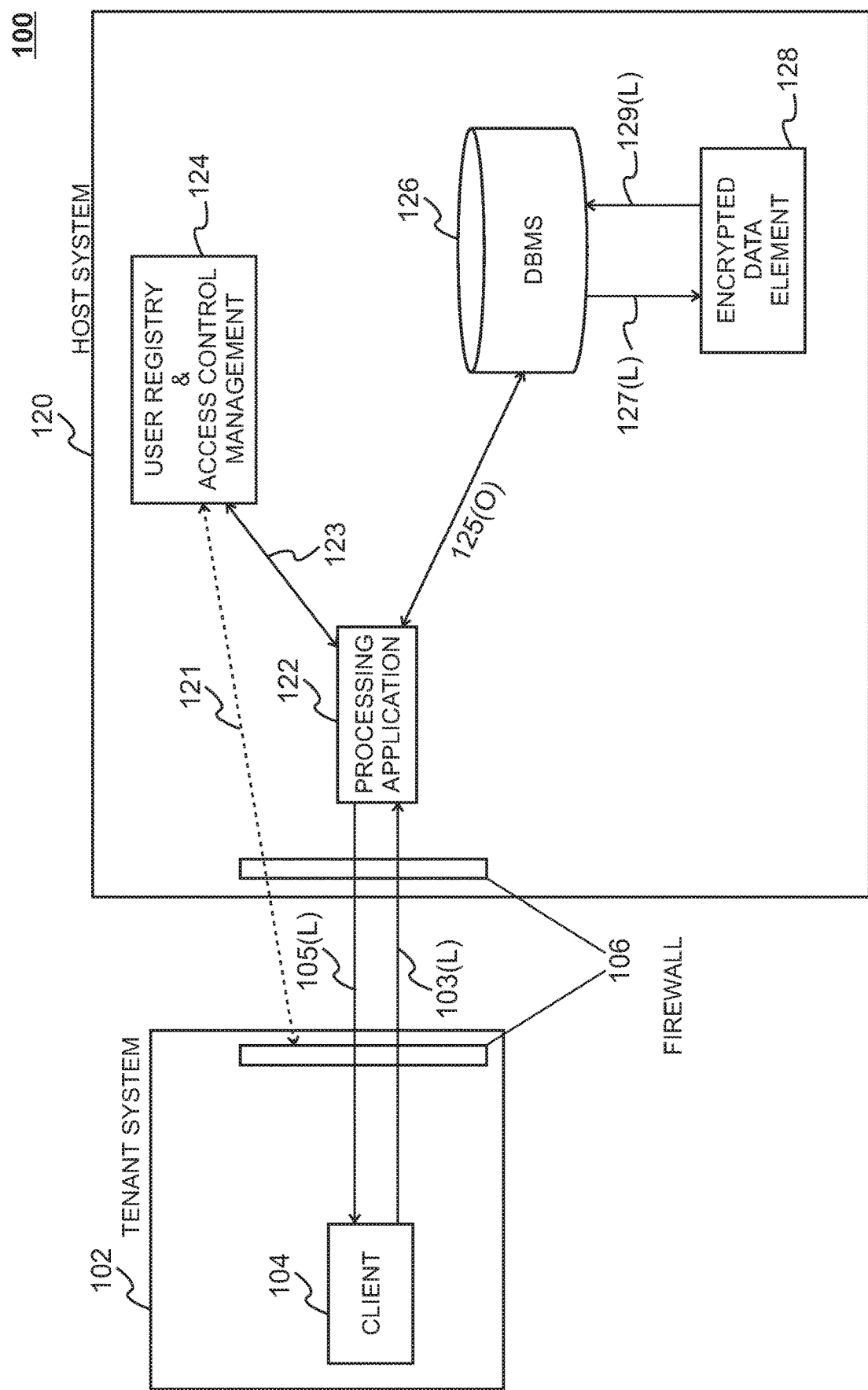
FIG. 1 shows a schematic of a hosted service system found in prior art.

FIG. 1 illustrates a prior art schematic of a hosted service system 100. The hosted service system 100 includes a tenant system 102 and a host system 120. In the hosted service system 100, as an example, an company data management system has been offered as a hosted service (such as, for example, SaaS) to the tenant system 102 and company data resides in the host system 120 (also alternatively referred to herein as "a vendor"). The company data management system may include sensitive data (e.g., upcoming product plans, company confidential information, etc.) that a consumer of the service, in this case a client 104 of the tenant system 102, would prefer to keep confidential even from the host system 120.

The tenant system 102 and the host system 120 are communicatively coupled via a network and are separated by a firewall 106. The tenant system is adapted to have a plurality of clients even though in the exemplary tenant system 102 of FIG. 1, only one client 104 is shown.

The host system 120 includes a user registry and access control management element (UR-ACM) 124, a processing application 122, a database management system (DBMS) 126, and an encrypted data element 128. The UR-ACM 124 is adapted to authenticate a user of the client 104. This authentication occurs via a communication link 121 between the tenant system 102 and the UR-ACM 124. A tenant request 103 is transmitted from the tenant system 102 to the host system 120 in a secure manner, as indicated by the letter "L" in brackets as (L) next to 103. The secure transmission is facilitated by the firewall 106 and also by the encryption using transport layer protocols, such as, for example, the Secure Socket Layer (SSL) protocol. The processing application 122 is adapted to communicate with the UR-ACM 124 via a communication link 123 and is adapted to process a tenant request 103 and transmit a query via a communication link 125 to the DBMS 126. The communication link 125 is shown having a notation (O)(for example, 125(O)) indicating that it is not secure and that it is open.

The DBMS 126 communicates with an encrypted data element 128 by sending a secure query 127 to receive a secure query result 129 from the encrypted data element 128. Various encryption methodologies exist to encrypt the data stored in the encrypted data element 128. The public key infrastructure (PKI) and the Data Encryption Standard (DES) are well known examples of encryption methodologies in the prior art. The secure query 127 and/or the secure query result 129 may include sensitive data, such as, for example, salary data. This sensitive data is secure as indicated by a notation (L) next to both the secure query 127 and the secure query result 129. Further, the processing application 122 processes the result from the DBMS and processes the result to send communication to the tenant system 102 via a communication link 105 across the firewall 106. This communication link 105 is again secure as indicated by (L) next to 105. This security is facilitated by various transport layer protocols, such as, for example SSL.

Even though the sensitive data is secure while the data is transmitted via communication links 103 and 105 or sent as the secure query 127 and received as the secure query result 129, when the DBMS 126 communicates with the processing application 122, the communication link 125 is not secure and hence the internal users of the host system 120 may have access to the sensitive data of the client 104. The internal users can be the database administrators of the DBMS 126 or the consumers of the processing application 122 or both.

Figure 2:
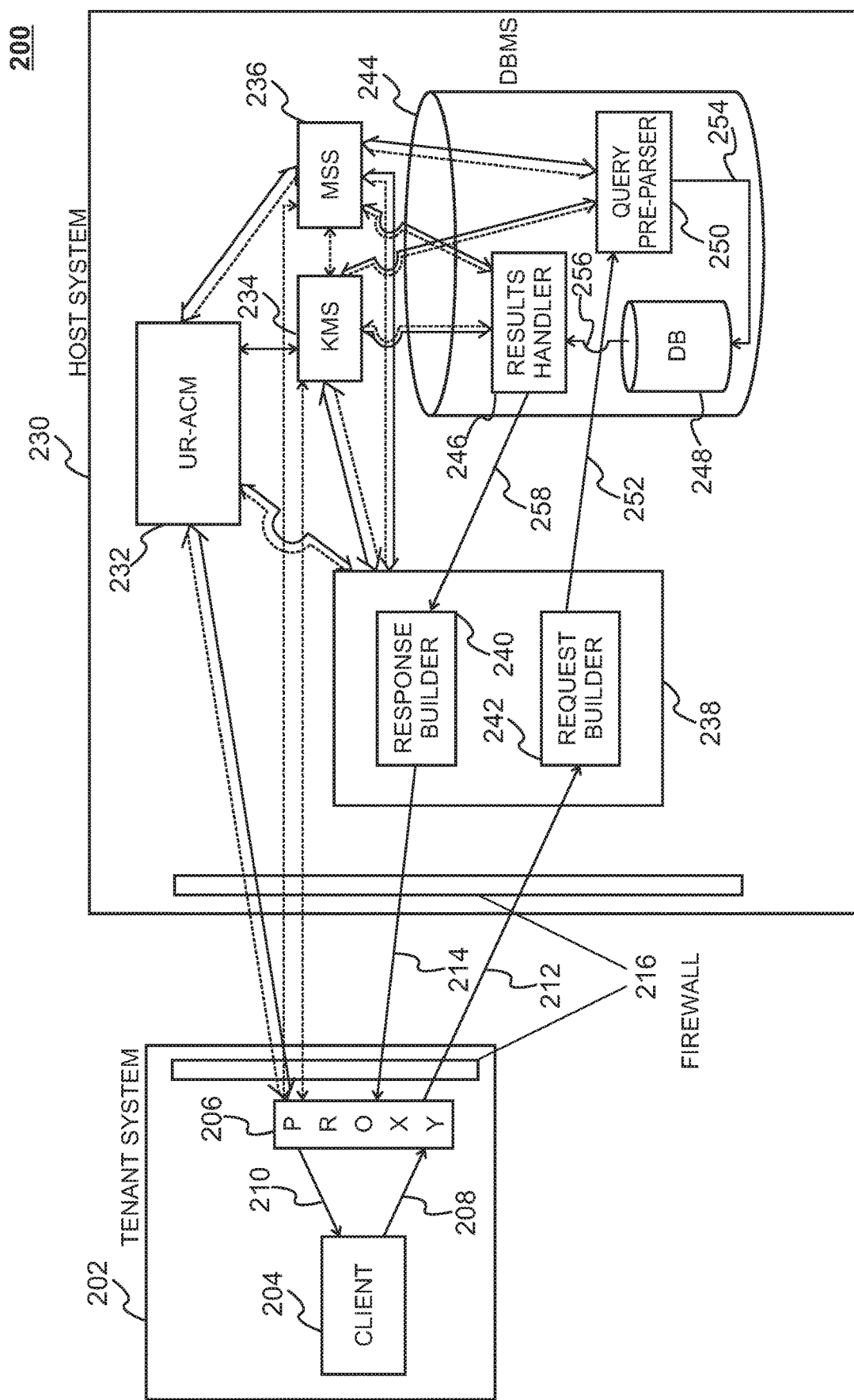
FIG. 2 schematically illustrates a hosted service system rendered as a delegated hosted service system, according to an embodiment of the disclosure.

FIG. 2 illustrates a schematic of a hosted service system rendered as a delegated hosted service system 200, according to one embodiment of the present disclosure. The delegated hosted service system for protecting sensitive data in a hosted system is described. The delegated hosted service system 200 includes a tenant system 202 and a host system 230. The host system 230 is adapted to process at least some data of the tenant system 202. The tenant system 202 and the host system 230 are communicatively coupled to each other over a network (not shown) and a firewall 216. For the purposes of this document, the sensitive data is a subset of data residing in the hosted service system. In an exemplary mode, a client of the tenant system 202 may define the sensitive data.

The tenant system 202 includes a plurality of clients 204, one of which is shown, and a proxy 206. The proxy 206 is adapted to (a) receive and process a client request 208 from the client 204, (b) transmit the processed client request as a tenant request 212 to the host system 230, and (c) receive and process a host response 214 from the host system 230 and transmit the processed host response as a client response 210 to the client 204.

The host system 230 can be a real server or a virtual server. The host system 230 includes a database management system (DBMS) 244. The DBMS 244 further includes a database 248, a results handler 246 and a query pre-parser 250. The results handler 246 is adapted to process a database query result (DB query result) 256 from the database 248 and transmit a query result 258. The query pre-parser 250 is adapted to process a query 252 and transmit a database query (DB query) 254 to the database 248.

The host system 230 further includes a user registry and access control management element (UR-ACM) 232. The UR-ACM 232 is adapted to authenticate a user of the client 204.

The host system 230 is further adapted to include a processing application 238. The processing application 238 further includes a request builder 242 and a response builder 240. The request builder 242 is adapted to process a tenant request 212 from the tenant system 202 and route the processed request as a query 252 to the query pre-parser 250. The response builder 240 is adapted to process a query result 258 from the results handler 246 and route the processed query result as a host response 214 to the proxy 206.

The host system 230 further includes a key management system (KMS) 234 and a metadata service system (MSS) 236, wherein the KMS 234 and the MSS 236 are communicatively coupled to each other. The KMS 234 and the MSS 236 both are communicatively coupled to the UR-ACM 232. The delegated hosted service system 200 is adapted to enable communication between the results handler 246 and the KMS 234 and MSS 236. The delegated hosted service system 200 is further adapted to enable communication between the query pre-parser 250 and the KMS 234 and the MSS 236. The processing application 238 is adapted to be communicatively coupled to the KMS 234, the MSS 236 and the UR-ACM 232.

The KMS 234 is adapted to function as a repository of encryption keys, wherein the encryption keys are used to encrypt sensitive data of the tenant system 202, wherein the sensitive data is at least a part of the data of the tenant system 202. At least one encryption key is administered by the tenant system 202.

In one embodiment, the KMS 234 is a repository of symmetric keys used to encrypt sensitive data. The tenant system 202 may control access to the symmetric keys in a delegated administration mode and corresponding requests and responses are logged. A symmetric key is assigned per client 204 per role. It is possible that the same client 204 may have different roles, such as, for example, as an administrator, and as an access control based role, such as a "read only" role. Every role per client 204 has a corresponding database user. The KMS 234 has the capability of generating new set of keys (refreshing the key set) for every client 204 of the tenant system 202 based on a set of configurable parameters.

In one embodiment, when the processing application 238 requests the key for inclusion in its response to the client 204, the key is encrypted using the public key of the client 204 and the role as described earlier. This is to isolate the access of the processing application 238 to the sensitive data.

The MSS 236 is adapted to maintain metadata of the sensitive data, wherein the metadata includes encryption information. In an embodiment of the present disclosure, a configuration interface (not shown) may be used by the client 204 of the tenant system 202 to define this metadata. The configuration interface abstracts the metadata so that the client 204 can configure it. For example, a column in a table can be mapped to an attribute in the configuration interface. Only the client 204 is enabled to query and update the metadata included in the MSS 236. However, updates to metadata may have to be scheduled by an administrator of the host system 230. The administrator of the host system 230 may need to evaluate the effects of changes to metadata (existing applications which already use the current metadata may have to be gracefully terminated and some other processes may have to be restarted) and will schedule the metadata update accordingly.

The client 204 may upload the changed metadata to the MSS 236. The changes, however, may not get committed immediately. Instead, the administrator of the host system 230 may be notified that a metadata update for the client 204 has been requested. The administrator of the host system 230 then can schedule the update for a given time (after performing related administrative tasks) and notify the client 204 via the configuration interface that the update has been scheduled for a specific time. Once the scheduled update has been committed by the MSS 236, the MSS 236 sends out notifications to the administrator of the host system 230 and an administrator of the tenant system 202 that the metadata update has been committed successfully (or not).

The query pre-parser 250 is adapted to receive a query 252. A determination is made by the MSS 236 if the query 252 has a part of it associated with the sensitive data. If part of the query 252 is determined to be associated with the sensitive data then at least one encryption key corresponding to that part of the query 252 is received from the KMS 234. By using the at least one encryption key received corresponding to sensitive data part of the query 252, decryption of that part of the query 252 is performed, and the decrypted part of the query 252 is included in a modified query. Using at least one of the modified query or the query 252, the query pre-parser 250 generates a DB query 254 that is transmitted to the database 248.

The results handler 246 is adapted to receive a DB query result 256 from the database 248. A determination is made by the MSS 236 if a part of the DB query result 256 is associated with the sensitive data. If the part of the DB query result 256 is determined to be associated with the sensitive data, at least one encryption key corresponding to the part of the DB query result 256, is received from the KMS 234 and using the at least one encryption key received corresponding to the part of the DB query result 256, encryption of the part of the DB query result 256 is performed and then the encrypted part of the DB query result 256 is included in a modified DB query result. Using at least one of the modified DB query result or the DB query result 256, the results handler 246 generates a query result 258. The query result 258 is transmitted to the response builder 240. As described before, the response builder 240 is adapted to process the query result 258 from the results handler 246 and route the processed query result as the host response 214 to the proxy 206.

The proxy 206 is adapted to receive the host response 214. A determination is performed by the MSS 236 if the host response 214 has a part of the host response 214 associated with the sensitive data of the tenant system 202. If the part of the host response 214 is determined to be associated with the sensitive data then at least one encryption key corresponding to the sensitive data part of the host response 214 is received from the KMS 234 and, using the at least one encryption key received corresponding to the sensitive data part of the host response 214, decryption of the sensitive data part of the host response 214 is performed and the decrypted sensitive data part of the host response 214 is included in a modified host response. By manipulating at least one of the modified host response or the host response 214, the proxy 206 generates a client response 210. The manipulation may be performed using a data exchange format. The client response 210 is transmitted to the client 204.

The proxy 206 is adapted to receive the client request 208 from the client 204. A determination is performed by the MSS 236 if a part of the client request 208 is associated with the sensitive data of the tenant system 202. If the part of the client request 208 is determined to be associated with the sensitive data, at least one encryption key corresponding to the sensitive data part of the client request 208 is received by the proxy 206 from the KMS 234. By using the at least one encryption key received corresponding to the sensitive data part of the client request 208, encryption of the sensitive data part of the client request 208 is performed and the encrypted sensitive data part of the client request 208 is included in a modified client request. By manipulating at least one of the modified client request or the client request 208, the proxy 206 generates a tenant request 212. The manipulation may be performed using a data exchange format. The tenant request 212 is transmitted to the request builder 242.

The proxy 206 may be a request and response interceptor and manipulator. Based on the content type of the request or the response, the proxy 206 uses an appropriate XML parser/HTML parser or other parser. The parser looks for appropriate tags and decrypts the data inside the tag.

In the case of HTML content interception and manipulation, the implementation by the proxy 206 can be a browser plug-in. In the case of the manipulation of the host response 214 from the host system 230, an encrypted symmetric key can be used for decrypting the data that is received as part of the HTTP header. The key is encrypted using the public key of the client 204. The proxy 206 typically uses the private key of the client 204 to decrypt the host response 214. In the case of the manipulation of the client request 208, the key to be used to encrypt the data is obtained by querying the KMS 234. Once the key is obtained, it is passed on to the parser for encrypting/decrypting sensitive data.

The key and the HTML content are passed on to the HTML parser. The HTML parser looks for "marked" HTML fields, for example, a <div> field with an identification attached to it. When the HTML parser encounters the <div> field, the HTML parser encrypts/decrypts the content of the field using the key supplied to it.

In the case of XML content interception and manipulation, the symmetric key to be used for decrypting the data can be typically part of, as an example, the 'EncryptedData' element. The XML parser looks for 'EncryptedData' elements and decrypts XML element content (character data) and replaces it with the decrypted character data. This can be implemented as an extension to existing parsers or the SOAP Engine.

Figure 3:
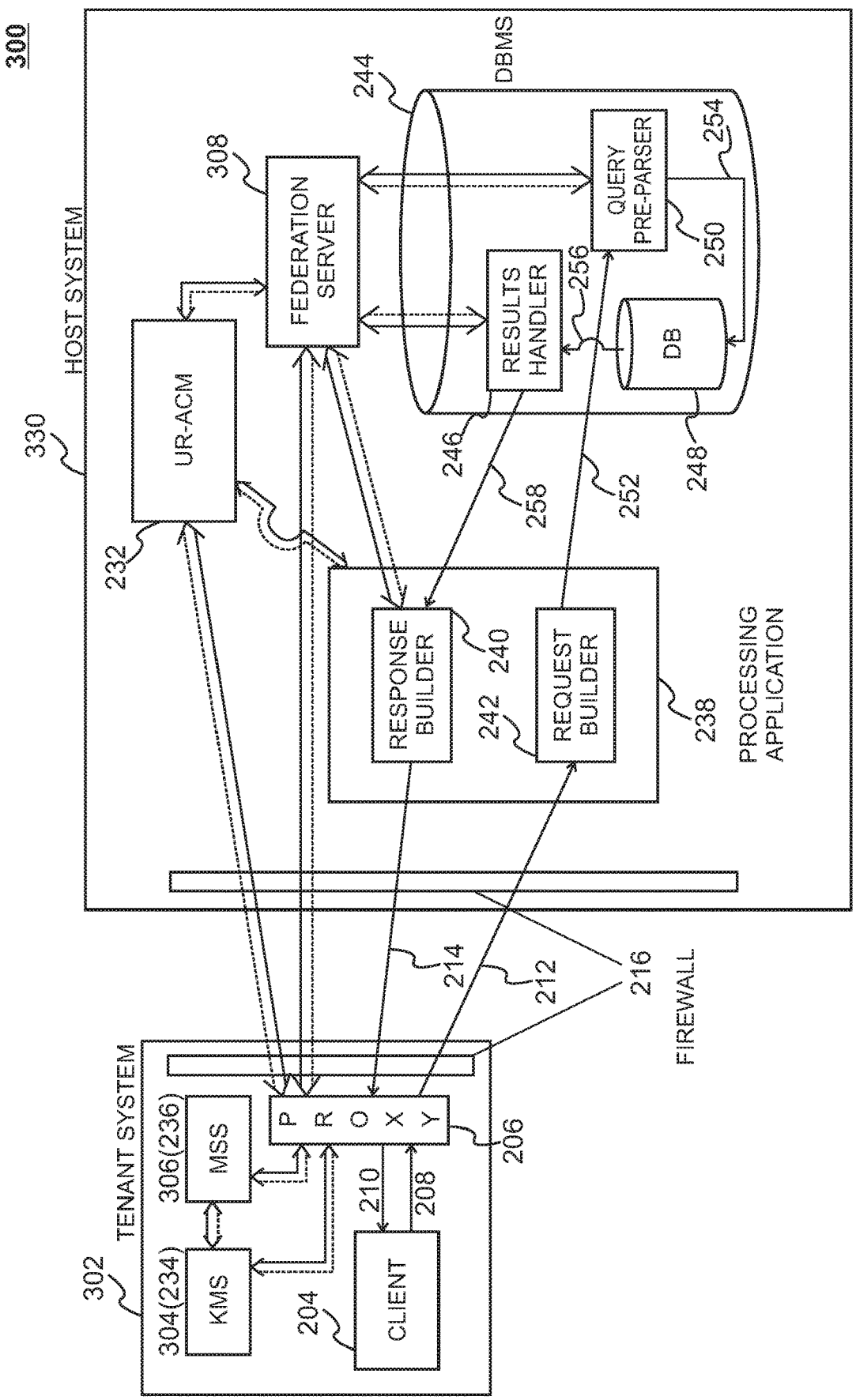
FIG. 3 schematically illustrates a hosted service system rendered as a federated hosted service system, according to an one embodiment of the disclosure.

FIG. 3 illustrates a schematic of a hosted service system rendered as a federated hosted service system 300, according to an exemplary embodiment of the present disclosure. The federated hosted service system 300 for protecting sensitive data in a hosted service system is described. The federated hosted service system 300 includes a tenant system 302 and a host system 330 communicatively coupled to each other over a network and a firewall 216. Elements, components and their corresponding functions of the tenant system 202 and the host system 230 of FIG. 2 are identical to the tenant system 302 and the host system of FIG. 3 respectively. Only the differences will be described in detail.

The host system 330 includes a federation server 308. The federation server 308 is communicatively coupled to the query pre-parser 250, the results handler 246 and the UR-ACM 232. The tenant system 302 includes the KMS 304 (234 of FIG. 2) and MSS 306 (236 of FIG. 2). The KMS 304 and the MSS 306 are communicatively coupled to each other. The KMS 304 and the MSS 306 are both communicatively coupled to the federation server 308 via the proxy 206. The query pre-parser 250 and the results handler 246 are both communicatively coupled to the KMS 304 and the MSS 306 via the federation server 308. The processing application 238 is communicatively coupled to the federation server 308.

In an exemplary federated hosted service system embodiment, the retrieval of the keys from the host system 330 by the proxy 206 and inclusion of the key in the host response 214 from the response builder 240 can be completely avoided. The proxy 206 may instead fetch the keys from the KMS 304 hosted inside the firewall 216 of the tenant system 302. The federation server 308 will request keys from the KMS 304 hosted at the tenant system 302 as required.

Figure 4:
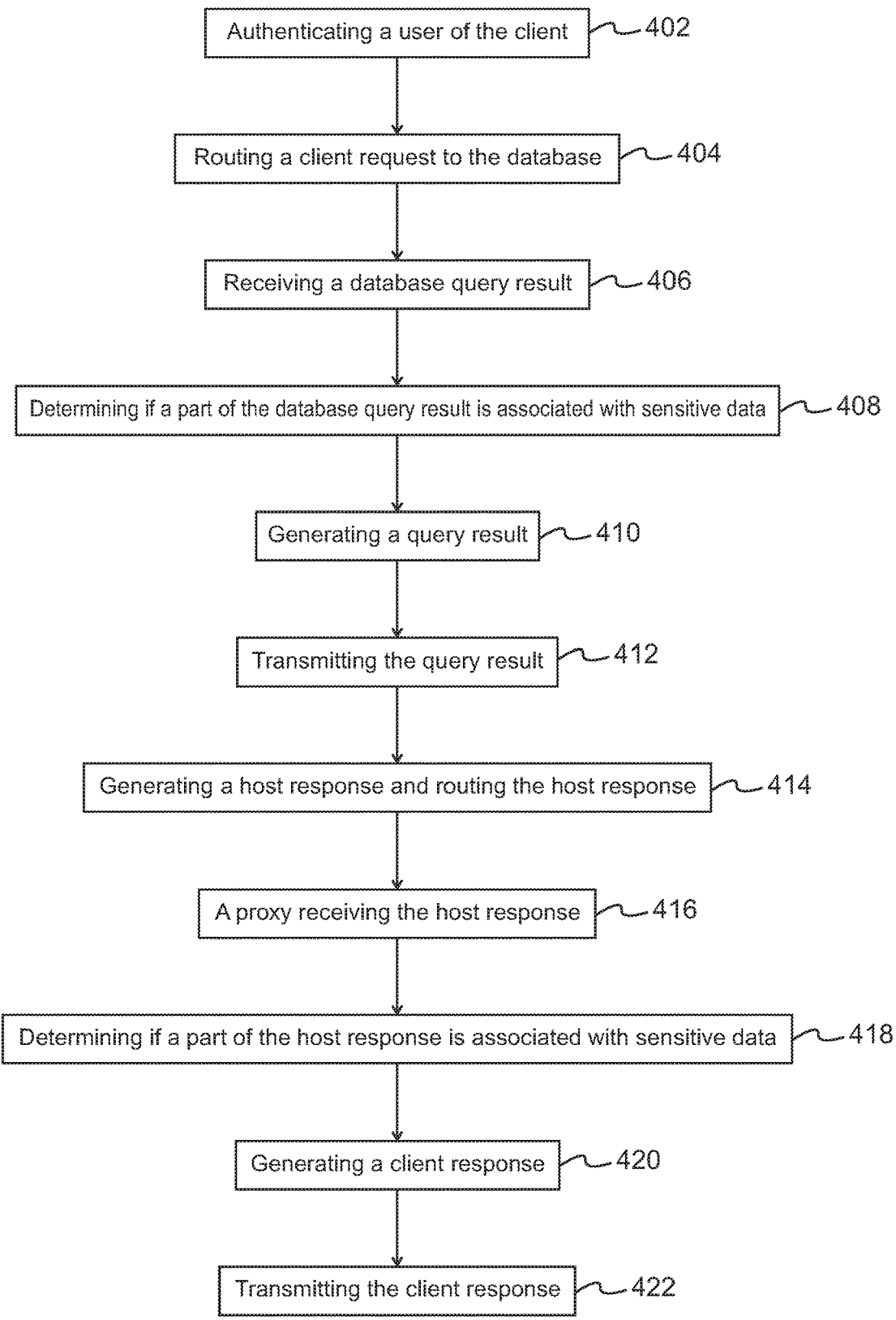
FIG. 4 shows a methodology for protecting sensitive data in a hosted service system while the sensitive data is being fetched from a host system, according to an embodiment of the disclosure.

FIG. 4 shows a flow chart illustrating a general process 400 for protecting sensitive data in a hosted service system, while the sensitive data is being fetched from a host system 230 (FIG. 2), according to an embodiment of the present disclosure. The exemplary hosted service system is a delegated hosted service system 200 as described in FIG. 2 and it includes the host system 230 and a tenant system 202 (FIG. 2). It should be noted that according to another embodiment of the disclosure, the sensitive data fetching from a host system 330 can be performed using a federated hosted service system 300 as described in FIG. 3.

As depicted in block 402, a user of a client 204 (FIG. 2) is authenticated, wherein the tenant system 202 includes the client 204, and wherein the authentication is performed by a user registry and access control management element (UR-ACM) 232 (FIG. 2), and wherein the host system 230 includes the UR-ACM 232. Block 404 depicts routing a client request 208 (FIG. 2) from the client 204 to the database 248 (FIG. 2). Since the client request 208 in the exemplary method does not have any sensitive data, the client request 208 is not encrypted by a proxy 206 (FIG. 2), wherein the proxy 206 is included in the tenant system 202, and a query 252 (FIG. 2) is transmitted to the database 248. According to another embodiment of the present disclosure, a request builder 242 (FIG. 2) of a processing application may use the client request 208 and generate a query 252 which is then transmitted to the database 248.

Block 406 depicts a results handler 246 (FIG. 2) receiving a database query result (DB query result) 256 (FIG. 2) from the database 248, wherein the host system 230 includes the database 248. Block 408 depicts determining if a part of the DB query result 256 is associated with the sensitive data, wherein the determination is performed by a metadata service system (MSS) 236 (FIG. 2), and wherein the MSS 236 is adapted to maintain metadata of the sensitive data, and wherein the metadata includes encryption information. If the part of the DB query result 256 is associated with the sensitive data then the results handler 246 receives, from a key management system (KMS) 234 (FIG. 2), at least one encryption key corresponding to the part of the DB query result 256. The KMS 234 is adapted to function as a repository of encryption keys, the encryption keys being used to encrypt the sensitive data. The part of the DB query result 256 is encrypted using the at least one encryption key corresponding to the part of the DB query result 256. A modified DB query result is generated, wherein the modified query result includes the encrypted part of the DB query result 256.

Block 410 depicts generating a query result 258 (FIG. 2) using at least one of the DB query result 256 or the modified DB query result. Block 412 depicts the results handler 246 transmitting the query result 258. In block 414, generating a host response 214 (FIG. 2) using the query result 258, wherein generating is performed by a processing application 238 (FIG. 2), wherein the processing application 238 is communicatively coupled to the MSS 236, the KMS 234 and the UR-ACM 232, and wherein the host system 230 includes the processing application 238, is depicted. Block 414 also depicts routing the host response 214 by the processing application 238 to the tenant system 202. Block 416 depicts the proxy 206 receiving the host response 214.

Block 418 depicts determining if a part of the host response 214 is associated with the sensitive data, wherein the determination is performed by the MSS 236. If the sensitive data part of the host response 214 is associated with the sensitive data, then the proxy 206 receives, from the KMS 234, at least one encryption key corresponding to the sensitive data part of the host response and decrypts the sensitive data part of the host response 214 using the at least one encryption key corresponding to the sensitive data part of the host response 214, and generates a modified host response, wherein the modified host response includes the decrypted sensitive data part of the host response 214. Block 420 depicts generating a client response 210 (FIG. 2) by manipulating at least one of the host response 214 or the modified host response, wherein the manipulation may be performed using a data exchange format. Block 422 depicts transmitting the client response 210 to the client 204.

Figure 5:
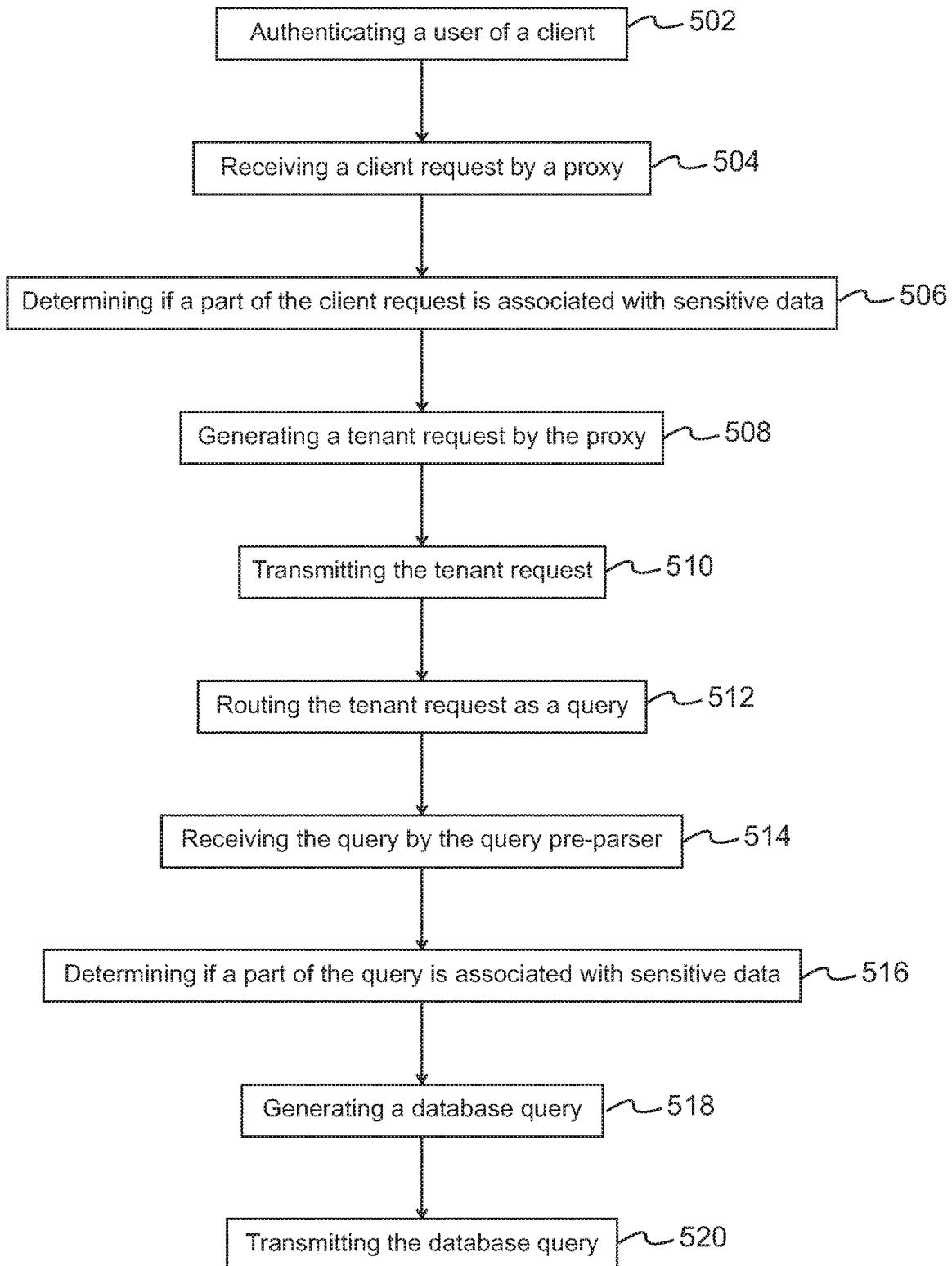
FIG. 5 shows a methodology for protecting sensitive data in a hosted service system while the sensitive data is being transmitted from a tenant system to a host system, according to an embodiment of the disclosure.

FIG. 5 shows a flow chart illustrating a general process 500 for protecting sensitive data in a hosted service system, while the sensitive data is being transmitted from a tenant system 202 (FIG. 2) to a host system 230 (FIG. 2), according to an embodiment of the present disclosure. The exemplary hosted service system is a delegated hosted service system 200 as described in FIG. 2 and it includes the host system 230 and a tenant system 202. It should be noted that according to another embodiment of the present disclosure, the transmission of the sensitive data from a tenant system 302 to a host system 330 can be performed using a federated hosted service system 300 as described in FIG. 3.

As depicted in block 502, a user of a client 204 (FIG. 2) is authenticated, wherein the tenant system 202 includes the client 204. The authentication is performed by a user registry and access control management element (UR-ACM) 232 (FIG. 2). The host system 230 includes the UR-ACM 232. Block 504 depicts a proxy 206 (FIG. 2) receiving a client request 208 (FIG. 2) from the client 204. The tenant system 202 includes the client 204 and the proxy 206. Block 506 depicts determining if a part of the client request 208 is associated with the sensitive data, wherein the determination is performed by a metadata service system (MSS) 236 (FIG. 2). The MSS 236 is adapted to maintain metadata of the sensitive data, and the metadata includes encryption information. If the part of the client request 208 is associated with the sensitive data, then the proxy 206 receives at least one encryption key corresponding to the part of the client request 208 from a key management system (KMS) 234 (FIG. 2).

The KMS 234 is adapted to function as a repository of encryption keys and the encryption keys are used to encrypt the sensitive data. The sensitive data part of the client request 208 is encrypted using the at least one encryption key corresponding to the sensitive data part of the client request 208 and a modified client request is generated, wherein the modified client request includes the encrypted sensitive data part of the client request 208. Block 508 depicts proxy 206 generating a tenant request 212 by manipulating at least one of the client request 208 or the modified client request, wherein the manipulation may be performed using a data exchange format. Block 510 depicts the proxy 206 transmitting the tenant request 212 to the host system 230. Block 512 depicts routing the tenant request 212 as a query 252. This routing may be performed by a request builder 242 (FIG. 2), wherein the request builder 242 is a part of a processing application 238 (FIG. 2) and the host system 230 includes the processing application 238.

Block 514 depicts a query pre-parser 250 (FIG. 2) receiving the query 252. The host system 230 includes the query pre-parser 250. Block 516 depicts determining if the query 252 received by the query pre-parser 250 has a part of the query 252 associated with the sensitive data, wherein the determination is performed by the MSS 236. If the part of the query 252 is associated with the sensitive data, then the query pre-parser 250 receives from the KMS 234 at least one encryption key corresponding to the sensitive data part of the query 252, decrypts the sensitive data part of the query 252 using the at least one encryption key corresponding to the sensitive data part of the query 252, and generates a modified query where the modified query includes the decrypted sensitive data part of the query 252. Block 518 depicts generating a database query (DB query) 254 (FIG. 2) using at least one of the query 252 or the modified query. Block 520 depicts the query pre-parser 250 transmitting the DB query 254 to a database 248 (FIG. 2) wherein the host system 230 includes the database 248.

It should be noted that according to another embodiment of the disclosure, the transmission of the sensitive data from a tenant system 202 of FIG. 2 to a host system 230 of FIG. 2 and/or from a tenant system 302 of FIG. 3 to a host system 330 of FIG. 3, and, substantially simultaneously where the sensitive data is being fetched from a host system 230 of FIG. 2 or 330 of FIG. 3, can be performed using the delegated hosted service system as described in FIG. 2 as well as a federated hosted service system as described in FIG. 3, respectively.

It should be noted that according to an embodiment of the disclosure, a system rendered as a delegated hosted service system includes a first system and a second system communicatively coupled to each other via a network. In one exemplary embodiment of the present disclosure, the first system is equivalent of and has all the elements and components of the host system 230 as described in FIG. 2. The second system is equivalent of and has all the elements and components of the tenant system 202 as described in FIG. 2.

Figure 6:
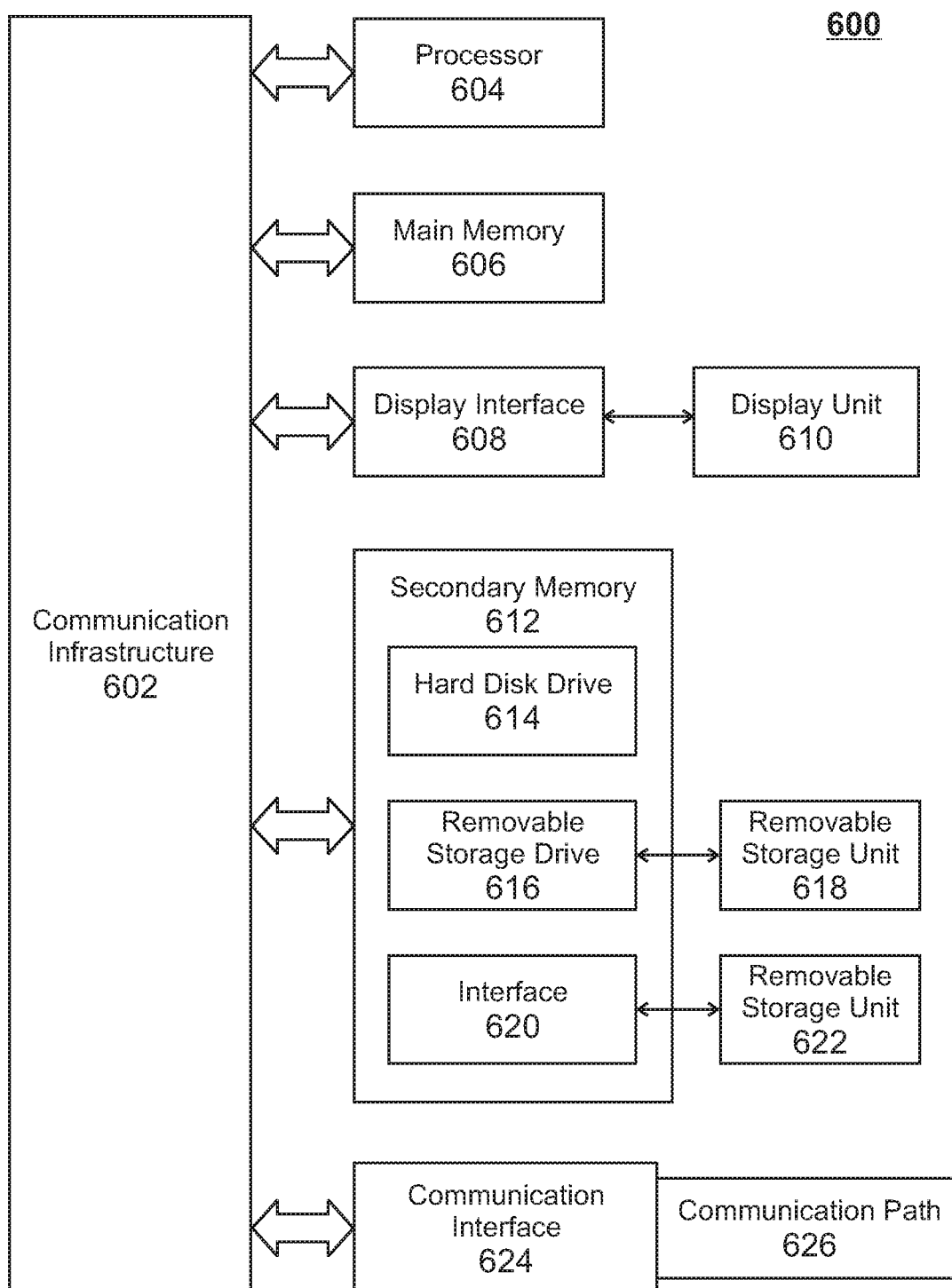
FIG. 6 shows detailed schematic of a computer system used for protecting sensitive data in hosted service systems as disclosed in FIG. 2 and FIG. 3.

FIG. 6 is a block diagram of an exemplary computer system 600 that can be used for implementing various embodiments of the present disclosure. In some embodiments, the computer system 600 can be used as the tenant system 202 of FIG. 2 and/or the tenant system 302 of FIG. 3. In some embodiments, the computer system 600 can be used as the host system 230 as shown in FIG. 2 and/or the host system 330 of FIG. 3. In other embodiments, the computer system 600 can be used as the DBMS 244 as shown in FIG. 2 and/or FIG. 3. FIG. 6 is a block diagram of an exemplary computing system, for example, such as a desktop computer, laptop computer, PDA, mobile phone and the like, that can be used for implementing exemplary embodiments of the present disclosure described in FIG. 2 to FIG. 5.

The computer system 600 includes a processor 604. It should be understood that although FIG. 6 illustrates a processor, one skilled in the art would appreciate that more than one processor can be included, or the number of processors can be increased or decreased on an as-needed basis. The processor 604 is connected to a communication infrastructure 602 (for example, a communications bus, cross-over bar, or network). Various software embodiments are described in terms of this exemplary computer system. After reading this description, it will become apparent to a person of ordinary skill in the relevant art(s) how to implement the present disclosure using other computer systems and/or computer architectures.

Exemplary computer system 600 can include a display interface 608 configured to forward graphics, text, and other data from the communication infrastructure 602 (or from a frame buffer not shown) for display on a display unit 610. The computer system 300 also includes a main memory 606, which can be random access memory (RAM), and may also include a secondary memory 612. The secondary memory 612 may include, for example, a hard disk drive 614 and/or a removable storage drive 616, representing a floppy disk drive, a magnetic tape drive, an optical disk drive, etc. The removable storage drive 616 reads from and/or writes to a removable storage unit 618 in a manner well known to those having ordinary skill in the art. The removable storage unit 618, represents, for example, a floppy disk, magnetic tape, optical disk, etc. which is read by and written to by the removable storage drive 616. As will be appreciated, the removable storage unit 618 includes a computer usable storage medium having stored therein computer software and/or data.

In exemplary embodiments, the secondary memory 612 may include other similar means for allowing computer programs or other instructions to be loaded into the computer system. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to the computer system 600.

The computer system 600 may also include a communications interface 624. The communications interface 624 allows software and data to be transferred between the computer system and external devices. Examples of the communications interface 624 may include a modem, a network interface (such as an Ethernet card), a communications port, a PCMCIA slot and card, etc. Software and data transferred via the communications interface 624 are in the form of signals which may be, for example, electronic, electromagnetic, optical, or other signals capable of being received by communications interface 624. These signals are provided to the communications interface 624 via a communications path (that is, channel) 626. The channel 626 carries signals and may be implemented using wire or cable, fiber optics, a phone line, a cellular phone link, an RF link, and/or other communications channels.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It can be appreciated that the illustrative embodiments may be utilized in many different types of data processing environments including a distributed data processing environment, a single data processing device, or the like.

Computer programs (also referred to herein as computer control logic) are stored in the main memory 606 and/or the secondary memory 612. Computer programs may also be received via the communications interface 624. Such computer programs, when executed, can enable the computer system to perform the features of exemplary embodiments of the present invention as discussed herein. In particular, the computer programs, when executed, enable the processor 604 to perform the features of the computer system 600. Accordingly, such computer programs represent controllers of the computer system.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

When a single element or article is described herein, it will be apparent that more than one element/article (whether or not they cooperate) may be used in place of a single element/article. Similarly, where more than one element or article is described herein (whether or not they cooperate), it will be apparent that a single element/article may be used in place of the more than one element or article. The functionality and/or the features of an element may be alternatively embodied by one or more other elements which are not explicitly described as having such functionality/features. Thus, other embodiments need not include the element itself.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the present disclosure have been described in detail, it should be understood that various changes, substitutions and alternations could be made thereto without departing from spirit and scope of the inventions as defined by the appended claims. Variations described for exemplary embodiments of the present disclosure can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present disclosure.

What is claimed is:

1. A hosted service system for protecting sensitive data, the system comprising:
  a host computer system having a hardware processor, wherein the host computer system includes:
  a database management system (DBMS), the DBMS having:
   a database; and
   a query pre-parser; and
  a processing application configured to process a request from a tenant system and route the processed request as a query to the query pre-parser;
  wherein the query pre-parser is configured to:
   decrypt a sensitive data part of the query;
   generate a modified query including the decrypted sensitive data part;
   generate a database query using the modified query; and
   transmit the database query to the database;
  wherein the DBMS further includes a results handler configured to:
   receive a database query result (DB query result) from the database;
   determine if a part of the DB query result is associated with the sensitive data; and
   if the part of the DB query result is associated with the sensitive data:
    encrypt the part of the DB query result; and
    generate a modified DB query result, wherein the modified DB query result includes the encrypted part of the DB query result; and
    receive an encryption key associated with the part of the DB query result associated with the sensitive data from an encryption key management system (KMS) of the host computer system.

2. The system of claim 1, wherein the host computer system further includes a metadata service system (MSS), and wherein the MSS is configured to determine if the query has the sensitive data part.

3. The system of claim 1, wherein the host computer system further includes an encryption key management system (KMS), and wherein the query pre-parser is configured to receive a first encryption key to decrypt the sensitive data part from the KMS.

4. The system of claim 3, wherein the first encryption key is administered by the tenant system.

5. The system of claim 1, wherein the results handler is further configured to generate a query result in response to the database query.

6. The system of claim 1, further comprising a user registry and access control management element (UR-ACM), wherein the UR-ACM is configured to authenticate a user of a client associated with the tenant system.

7. A method, comprising:
  processing a request received from a tenant system and routing the processed request as a query to a query pre-parser of a database management system (DBMS);
  decrypting, by the query pre-parser, a sensitive data part of the query;
  generating, by the query pre-parser, a modified query including the decrypted sensitive data part;
  generating, by the query pre-parser, a database query using the modified query;
  transmitting, by the query pre-parser, the database query to a database of the DBMS; and
  receiving a database query result (DB query result) from the database;
  determining if a part of the DB query result is associated with sensitive data; and
  if the part of the DB query result is associated with the sensitive data:
   encrypting the part of the DB query result; and
   generating a modified DB query result including the encrypted part of the DB query result; and
  receiving an encryption key associated with the part of the DB query associated with the sensitive data from an encryption key management system (KMS).

8. The method of claim 7, further comprising determining, by a metadata service system (MSS), if the query has the sensitive data part.

9. The method of claim 7, further comprising receiving, by the query pre- parser from an encryption key management system (KMS), a first encryption key to decrypt the sensitive data part.

10. The method of claim 9, further comprising administering the first encryption key by the tenant system.

11. The method of claim 7, further comprising generating, by a results handler of the DBMS, a query result in response to the database query.

12. A hosted service system for protecting sensitive data, the system comprising:
  a host computer system having a hardware processor, wherein the host computer system includes:
  a metadata service system (MSS); and
  a database management system (DBMS), the DBMS having:
   a database; and
   a query pre-parser; and
  wherein the MSS is configured to determine if a query received by the query pre-parser has a sensitive data part; and
  if the query received by the query pre-parser has the sensitive data part, the query pre-parser is configured to:
   decrypt the sensitive data part of the query;
   generate a modified query including the decrypted sensitive data part;
   generate a database query using the modified query; and
   transmit the database query to the database; and wherein the DBMS further includes a results handler configured to:
  receive a database query result (DB query result) from the database;
  determine if a part of the DB query result is associated with the sensitive data; and
  if the part of the DB query result is associated with the sensitive data:
    encrypt the part of the DB query result; and
    generate a modified DB query result, wherein the modified DB query result includes the encrypted part of the DB query result.

13. The system of claim 12, wherein the host computer system and a tenant system are separated by a firewall.

14. The system of claim 12, wherein the host computer system further includes an encryption key management system (KMS), and wherein the query pre-parser is configured to receive an encryption key to decrypt the sensitive data part from the KMS.

15. The system of claim 12, wherein the MSS is configured to maintain metadata of the sensitive data part, and wherein the metadata includes encryption information.

16. The system of claim 12, wherein the DBMS further includes a results handler configured to:
  receive a database query result (DB query result) from the database; and
  determine if a part of the DB query result is associated with sensitive data of a tenant system.

* * * * *